Patented Apr. 19, 1938

2,114,409

UNITED STATES PATENT OFFICE 2,114,409

PROCESS OF TREATING DATES

Virgil H. Tyler, Ventura County, Calif.

No Drawing. Application April 6, 1937,
Serial No. 135,273

6 Claims. (Cl. 99—103)

This process relates to the treatment of dates, and in particular to the maturation of dry and partly immature dates which grow under certain climatic conditions, including the introduction of additional moisture into the date. The object is to bring about artificially the chemical reaction of maturation, without producing skin rupture and stickiness on the date surface. Another object of the invention is to soften the internal structure of the date by introduction of moisture without producing skin rupture and without producing a sticky, syrupy coating on the outer surface. Another object is to produce marketable dates from the dry, wrinkled, immature dates of natural growth.

In date culture, the individual dates in a cluster ripen at different times, and it is the practice to pick only the mature dates, as they ripen. The best natural ripening takes place under quite dry atmospheric conditions, but at times the climatic conditions are so changed during the ripening period that a portion of the crop becomes excessively dry and wrinkled, the calyx end of the date is particularly shriveled and undeveloped, and the fruit, particularly in this calyx end, is of unpleasant taste, partly due to the fact that the tannin compounds of the unripe fruit are not converted by natural ripening to more palatable substances. It is believed that when the moisture content of the partially ripe date is reduced too low, that the chemical reactions of maturation are retarded or prevented. A naturally ripened date of the Deglet Noor variety varies in moisture from 21% to 40%, while a shriveled, dried, immature date will contain from 6% to 20% moisture. Other varieties have approximately the same range of moisture content.

A treatment known as the "Steam Process" is in common use in the United States by which excessively dry dates are treated in closed rooms under conditions providing repeated condensation of moisture on the surface of the dates. This treatment increases the water content of the dates, but has the disadvantage that the moisture content is greatest at the skin surface, and the result is a sticky, syrupy coating on the dates, a loosening of the skin of the date, a considerable darkening in color, and an increase in the rate and frequency of spoilage by bacterial and spore induced reactions. The dates are not as readily marketable because of this sticky condition of the surface, and the product is considered and must be sold as a preserved or processed food rather than as natural fruit.

My process obviates these difficulties and while simple in operation, produces results not heretofore attainable by any known process. I have discovered that if the dry immature dates are subjected to artificial atmospheric conditions which provide high humidity but without condensation of water on the fruit, that the ripening of the immature fruit may be readily accomplished, with an increase in the moisture content throughout the fruit structure, but without the formation of a sticky, syrupy, coating on the exterior of the dates, and without rupturing the date skin. With shriveled dates, my process causes the date pulp to swell enough to fill out the wrinkled skin, and produce a normal appearing fresh date. The bitter taste-producing tannins are reduced by my process, there is a minimum of inversion of the natural sugar, and the flavor is substantially that of tree-matured fruit.

As one example of my process, dry, shrivelled, immature dates are spread on trays and heated in a relatively dry atmosphere up to a temperature of 125 to 135 degrees Fahrenheit. They are then subjected to an atmosphere at the same temperature but having a relative humidity of 96 to 99 percent humidity, great care being taken to prevent the precipitation of water on any fruit or upon the containers. This condition of 96 to 99 percent relative humidity at temperatures of 125 to 135 degrees Fahrenheit is maintained for a period of about 11 hours, after which the temperature and relative humidity are reduced, without precipitation of water or dew, and the trays of dates removed. The dates thus treated have the appearance and taste of tree ripened dates, are not excessively wrinkled, are not appreciably darkened by the processing, have decreased bitter taste-producing tannin over the same original dates and are not sticky on the surfaces. If the conditions of the treatment are so regulated that the moisture content of the finished product is not over 26%, the spoilage with age is no greater than with naturally ripened fresh dates of a similar moisture content.

Alternative methods of changing the atmospheric conditions around the dates, or of moving the dates from one atmospheric condition to another may, of course be used, the essential condition being that the moisture must never be allowed to condense on the surface of the dates, or on the containers holding the dates. The rate at which the maturing and hydration processes take place depends upon the original condition of the dates as well as upon the processing temperature and the relative humidity. According to my experience the preferred treatment time is from 6 to 15 hours, the preferred temperature range is between 120 and 150 degrees Fahrenheit, and the preferred humidity is as near saturation for the prevailing temperature as may be attained without liability of reaching the dew point, in practice from about 85 to 100 percent relative humidity, depending upon the water content and the ripeness of the dates being treated. If a lower temperature, and/or a lower relative humidity is employed, the time factor becomes too great for commercial practicability. If a higher temperature is used, chemical changes within the date take place which effect the taste and consistency. However, I do not wish to limit myself to these precise temperatures, humidities and times, except as may be required by the prior art, and by the limitations of my process by which maturation and hydration of dry, unripe dates is accomplished by the introduction of moisture at slightly elevated temperatures, but with careful avoidance of surface condensation of moisture, or contact of the dates with liquid water.

I claim:

1. The process of simultaneous maturation and hydration of individual dry, unripe dates, comprising subjecting said dates to a hot, humid atmosphere without condensation of water on the surfaces of the dates and maintaining the relative humidity above the dew point.

2. In the process of simultaneous maturation and hydration of individual dry, unripe dates, the step of subjecting said dates to a substantially water saturated atmosphere maintained above the dew point at temperatures within the range of 120 to 150 degrees Fahrenheit.

3. In the process of simultaneous maturation and hydration of individual dry, unripe dates, the step of subjecting said dates to a substantially water saturated atmosphere maintained above the dew point at temperatures within the range of 120 to 150 degrees Fahrenheit for a time not exceeding about 24 hours.

4. The process of simultaneous maturation and hydration of individual dry, unripe dates comprising heating said dates to a temperature within the range of 120 to 150 degrees Fahrenheit in a relatively dry atmosphere, introducing said dates into an atmosphere of relative humidity slightly below the saturation point for the selected temperature within the range of 120 to 150 degrees Fahrenheit, subjecting said dates to the selected temperatures within the range of 120 to 150 degrees Fahrenheit and to substantially saturated humid air but without the presence of liquid moisture for a period of time sufficient to soften and mature said dates, and then cooling said dates to ordinary temperatures without condensation of moisture on their surfaces.

5. The process of simultaneous maturation and hydration of individual dry, unripe dates comprising heating said dates to a temperature within the range of 120 to 150 degrees Fahrenheit in a relatively dry atmosphere, introducing said dates into an atmosphere of relative humidity slightly below the saturation point for the selected temperature within the range of 120 to 150 degrees Fahrenheit and to substantially saturated humid air but without the presence of fog or liquid moisture, for a period of time not exceeding about 24 hours.

6. The process of treating individual dates comprising heating said dates to a temperature in excess of 120 degrees Fahrenheit in a relatively dry atmosphere, introducing said dates into an atmosphere having a relative humidity slightly below the dew point for the particular temperature selected in excess of 120 degrees Fahrenheit and in an atmosphere substantially saturated with moisture at the selected temperature but never at the dew point for this temperature for a period of time from 6 to 16 hours, and then cooling said dates to ordinary temperature without condensation of moisture on the surfaces of said dates.

VIRGIL H. TYLER.